Figure 8:
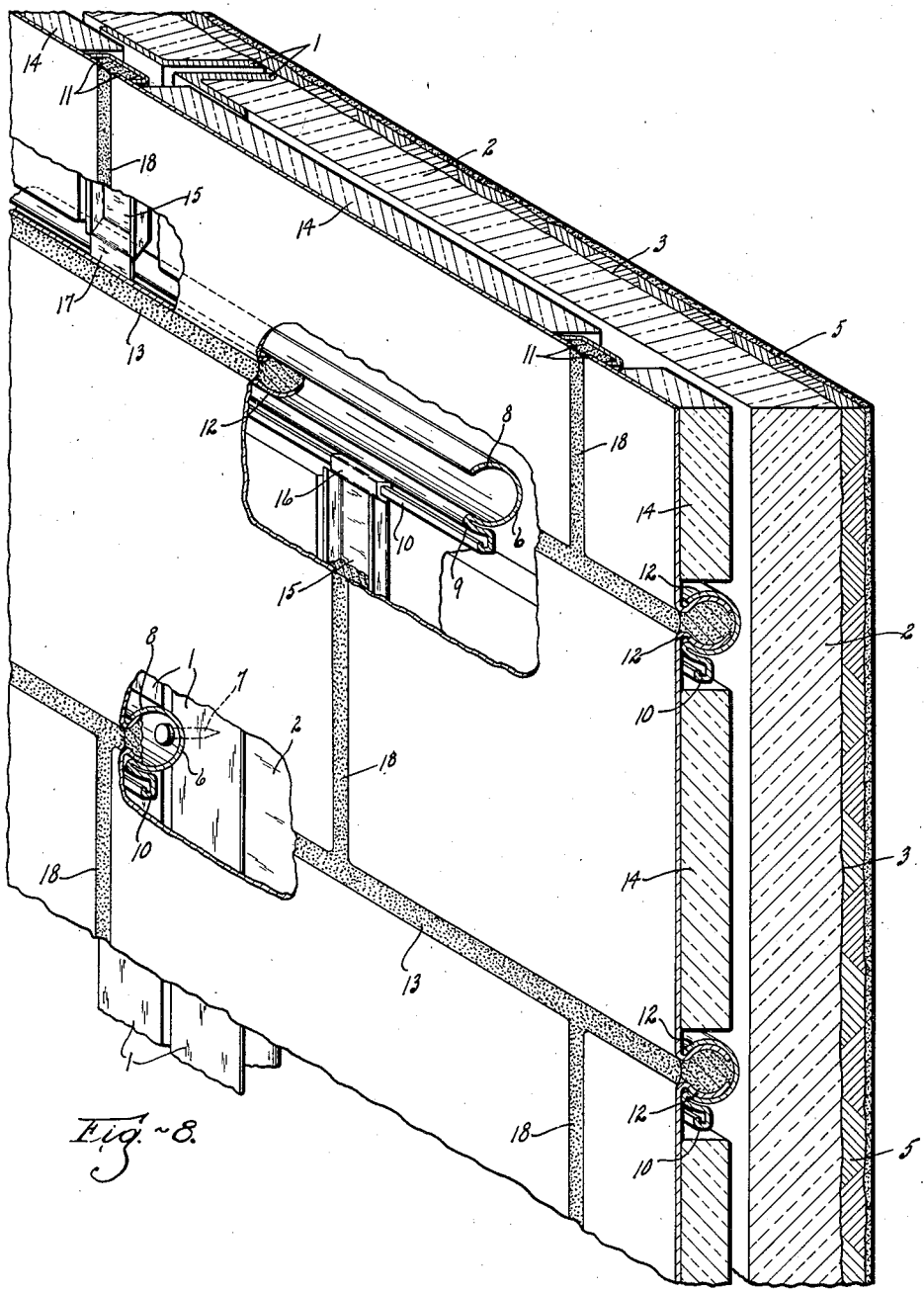

Sept. 18, 1934.   M. W. COPPER, JR., ET AL   1,973,795
BUILDING CONSTRUCTION
Filed Feb. 4, 1933   2 Sheets-Sheet 1
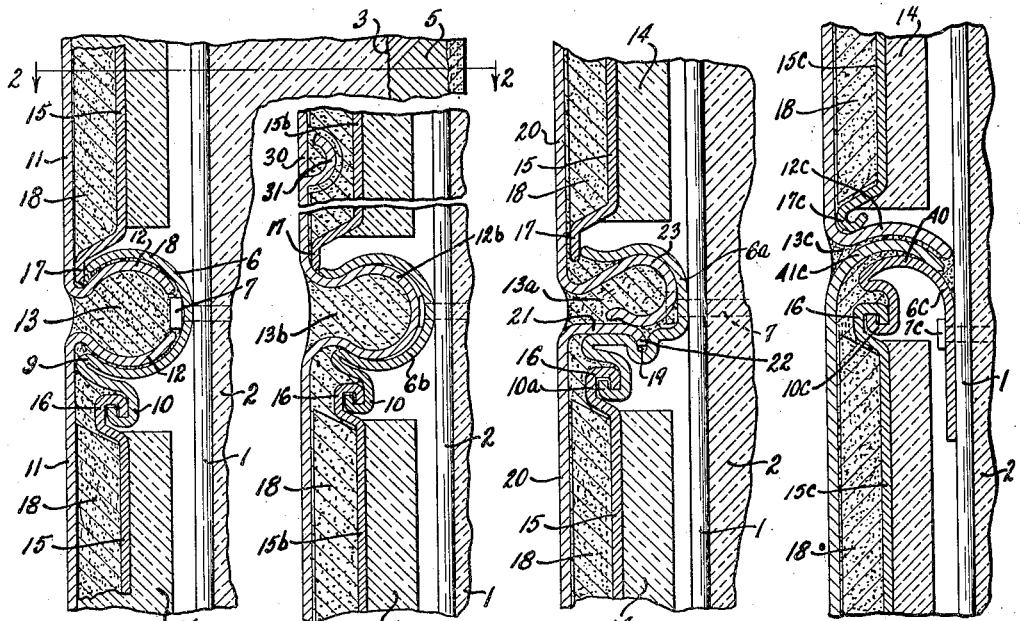
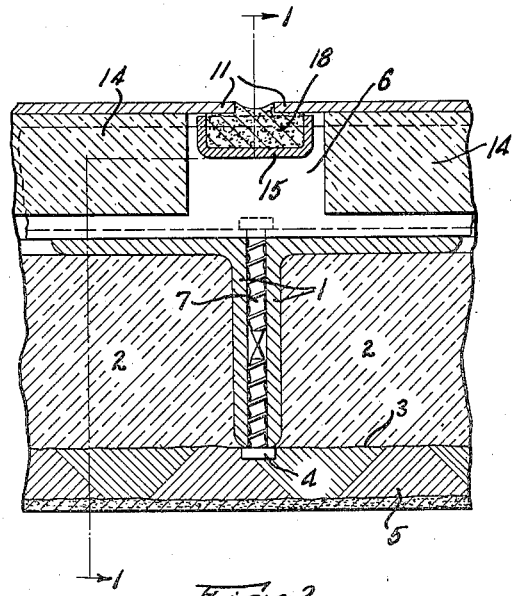
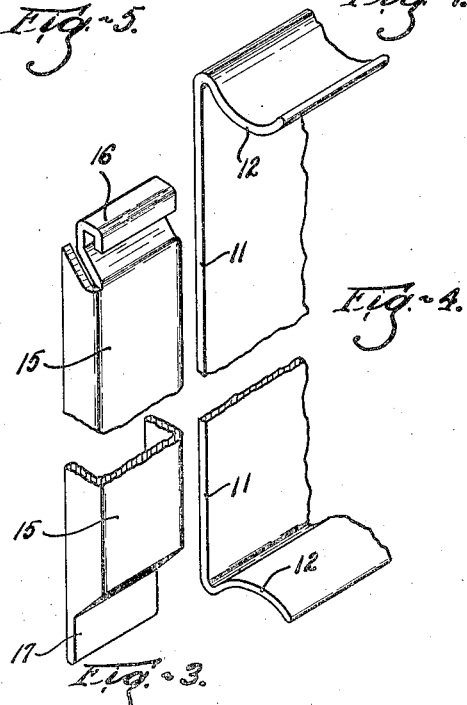
INVENTORS
MUNROE W. COPPER, JR.
AND
RUSSELL L. HOHL
BY Brockett, Hyde, Higley & Meyer
ATTORNEYS Sept. 18, 1934.  M. W. COPPER, JR., ET AL  1,973,795
BUILDING CONSTRUCTION
Filed Feb. 4, 1933   2 Sheets-Sheet 2

INVENTORS
MUNROE W. COPPER JR. AND
BY RUSSELL L. HOHL
Brockett, Hyde, Higley + Meyer
ATTORNEYS Patented Sept. 18, 1934

1,973,795

UNITED STATES PATENT OFFICE 1,973,795

BUILDING CONSTRUCTION

Munroe W. Copper, Jr., Gates Mills, and Russell L. Hohl, Shaker Heights, Ohio

Application February 4, 1933, Serial No. 655,224

15 Claims. (Cl. 72—18)

This invention relates to means for providing a surfacing, in panels, of sheet metal or the like, for a building wall structure.

The invention comprises generally improvements over the arrangement disclosed in the copending application, Serial No. 645,958 of Russell L. Hohl, joint applicant herein, filed December 6, 1932. In said copending application exterior surfacing panels of pan form are shown together with means for securing them to the body part of the wall to be surfaced.

An object of the present invention is to provide a simpler and cheaper panel unit, of sheet form rather than pan form, together with improved means for mounting the improved type of panel.

The invention contemplates a rectangular panel wherein one pair of opposite edges is deformed and the remaining pair of opposite edges may be undeformed or relatively plain. A further object of the invention is to provide means for sealing adjacent plain edges of adjacent panels, and to arrange for support of such sealing means from the panel supporting means, which is associated with the deformed edges of the panels.

Further objects of the invention are to provide a simple structure permitting rapid assembly without tools.

The exact nature of this invention together with further objects and advantages thereof will be apparent from the following description taken in connection with the accompanying drawings in which Figs. 1 and 2 are typical detail sections, vertical and horizontal respectively, of a typical wall structure embodying the invention, the plane of Fig. 1 being that indicated by the line 1—1, Fig. 2, and the plane of Fig. 2 being that indicated by the line 2—2, Fig. 1; Fig. 3 is a perspective detail of the receptacle for obtaining a seal in the structure of Figs. 1 and 2; Fig. 4 is a similar view of one of the wall panels there shown; and Figs. 5, 6 and 7 are views corresponding to Fig. 1 but illustrating modified arrangements. Fig. 8 is an assembly view in perspective, with parts broken away, and further illustrating the modification of Figs. 1 and 2.

With reference now to the drawings and first to Figs. 1-4 thereof, the wall body part shown, to which the surfacing panels are to be applied, comprises a plurality of spaced risers 1 of rolled metal in T-section as indicated, insulating filler means 2 in block or loose form, between the risers, metal lath 3 covering the filler means and secured to the risers as by screws 4 inserted in openings in the risers, and plaster 5 covering and secured by the lath. The arrangement thus far described will be observed as generally following that of the copending application to which reference has been made; but, as will become apparent, the exact nature of the wall body is immaterial, provided the runners to be disclosed may be secured thereto.

The risers 1 being vertically disposed in the wall, horizontally extending channel members 6 vertically spaced are secured to the wall body as by screws 7 inserted into the openings of the risers. The channel members are thus related to the wall body as runners therealong. These channel members may be of arcuate section as indicated in Fig. 1 with lips 8 and 9 at their lateral extremities forming grooves back of the lips. The lower lip of each channel member is extended as at 10 to provide a tail of hook form preferably turned outwardly or forwardly of the wall as indicated. The channel members are preferably of metal, having some flexibility, whereby their lips may spring as necessary to permit insertion or withdrawal of panel member parts, as will appear.

The panel members are of sheet metal, formed, as indicated Fig. 4, of rectangular blanks. Each panel member may have two of its opposite edges undeformed as at 11, and the other two opposite end parts are inwardly turned and reentrant as indicated at 12, with curvature to fit within the channel members 6. The length of each panel member between its deformed end parts 12 corresponds with the spacing between channel members 6, so that the panels may be applied to the wall by pushing the end parts of each into the cavities of two adjacent channels, each channel thus receiving one of the end parts 12 of each of an adjacent pair of panels. Obviously each panel member may thus be mounted upon a pair of runners, to extend therebetween, in any location therealong.

The panels being preferably of sheet metal, have some resilient yieldability for convenience in this operation, and they may be finished in any desired manner, as by enameling.

Once the panels are assembled with their channels, and thus secured with the wall body to provide the desired exterior surfacing therefor, the cavities of the channels, between the panel parts 12, may be filled with elastic cement applied as at 13 by a gun whereby a weatherproof seal is had.

It will be noted that the panels are positioned by their engagement with the channels so that the panel faces lie in a common plane, this plane being spaced from that of the risers 1. While air circulation in this space is prevented by the channels, if additional insulation against heat transfer be desired, the panels may be provided on their backs with blocks 14 of insulating material secured as by cementing.

The panels being conveniently of limited width between their plain edges 11, means are provided for sealing between such edges of adjacent pairs of panels. A receptacle device for the purpose is shown in Fig. 3. It comprises the body part 15 of trough-like section having at its upper extremity a hook part 16 adapted to engage the hook part 10 of a channel 6, as indicated Fig. 1, to support the body part 15 immediately back of the opening between an adjacent pair of panels as indicated Fig. 2. A tongue 17 extends from the lower extremity of the receptacle to engage the groove between a panel and channel as indicated Fig. 1. By proper adjustment of trough members along the channel members, the arrangement provides a trough back of each vertical joint between panels, into which elastic cement 18 may be forced in the same manner the cement is applied at 13, and by which arrangement the seal about each panel member is completed. It will be observed that each such sealing receptacle member is related to its pair of runners as a stretcher therebetween.

With reference now to the modification of Fig. 5, the general arrangement is as before except, notably, that the channel 6a is formed to provide a groove 19 along its bottom side. The channel is provided with a hook part 10a to receive the receptacle members 15 as before. The deformed end parts of the panels are modified in contour as indicated. The upper extremity of each panel 20 is bent inwardly as at 21 with a reentrant extremity 22 adapted to engage the notch 19 of the channel.

The lower extremity of each panel 20 is deformed to the hook shape indicated at 23 of sweeping curvature to enter the cavity of the channel 6a and bear, above, against the upper channel arm, and bear, below, upon the upper part 21 of the corresponding panel next therebelow. The parts being yieldable as before, assembly is had as to one of the channels by first inserting the lower panel with its upper part engaged as shown, and thereafter springing the lower part of the upper panel into position as shown. The cavity is then sealed with elastic cement 13a as before.

With reference to the modification of Fig. 6, the parts are generally as before with the exceptions to be noted, and principally the arrangement differs from that of Figs. 1–4 only in that the panel member part 12b which enters the channel member 6b is intermediate the ends of the panel member. There is, therefore, really no horizontal joint to be sealed, at the channel members, but cement 13b may be applied, nevertheless, as indicated, for architectural purposes.

The real horizontal joints between panel members are as indicated. The bottom edge 30 of each panel is plain and undeformed. The upper edge, however, is carried back and around as at 31 to provide a lip overhung by the bottom edge of the panel next above. Receptacles 15b are provided as before, to receive and retain sealing cement for the vertical joints. The side members of these receptacles are cut away as indicated in Fig. 6 to clear the lips 31.

With reference now to the modification of Fig. 7, the channel member 6c secured as by screws 7c has a single forwardly extending curved part 40 but terminates in a hook 10c similar to the hooks heretofore described for supporting the sealing receptacles 15c. Each panel member has along its lower edge an inwardly turned lip 12c and along its upper edge a correspondingly curved part 41c.

Thus the panel members may be secured upon the wall, by the channel member 40, with snap action as before, the upper part 41c of each panel member being secured between the lower part 12c of the panel member next above and the corresponding channel member. Sealing cement 13c may be applied to the horizontal joint as indicated.

The vertical joints are sealed as before, using the receptacles 15c as before. The lower extremity 17c of each receptacle may be curved as shown to engage the part 12c of the corresponding panel member and thus maintain the receptacle in proper position to back the panels.

In summary, the characteristics of the wall structures herein disclosed will be observed as follows. Each comprises a wall body part, panel sheathing therefor, and means for securing the sheathing upon the wall body. The securing means comprises spaced runners attached to the wall body in parallel spaced relation, in the form of channels. Each sheathing panel is attached at opposite edges to a pair of runners to extend therebetween, the nature of the attachment being one providing a spring or snap engagement, similar removability, and connection in any location along the runners. Sealing means for adjacent panel edges, between runners, includes stretchers carried by the runners, extending therebetween, and adjustable therealong.

While the specific showing herein has been of a vertically extending building wall, and for purposes of better describing the invention, terminology implying such a wall has been employed, it will be appreciated that this invention is not limited to application to a wall so disposed. The invention could as well be employed for example in a horizontally disposed ceiling wall or a sloping roof wall or, in fact, in any wall inside or outside and regardless of the plane in which it is disposed.

What we claim is:

1. In a wall structure of the character described and having a body part, channel means of uniform transverse section secured therewith to extend therealong opening outwardly thereof, said means having inwardly turned lips at their outer extremities forming lateral grooves back of the lips, and surfacing panel means having inwardly turned reentrant edge parts adapted to enter said channel means to be secured by engagement with the channel member lips, whereby said panel means may be mounted on said wall body part, some of said interengaging parts of said channel means and panel means being resilient to permit and maintain their said engagement.

2. In a wall structure of the character described and having a body part, a pair of channel members secured therewith to extend therealong as runners opening outwardly thereof in parallel spaced relation with each other, a pair of surfacing panels each having opposite end parts inwardly turned and entering said channel members and there secured, whereby said panels are mounted on said wall body part between said channel members, said panel members having their intermediate parts between their said ends spaced from said wall body part and said panel members being disposed adjacent each other, and a receptacle arranged back of the adjacent edges of said panels to receive and retain means for sealing the opening between said edges.

3. In a wall structure of the character described and having a body part, a pair of channel members secured therewith to extend therealong as runners opening outwardly thereof in parallel spaced relation with each other, a pair of surfacing panels each having opposite end parts inwardly turned and entering said channel members and there secured, whereby said panels are mounted on said wall body part between said channel members, said panel members having their intermediate parts between their said ends spaced from said wall body part and said panel members being disposed adjacent each other, and a receptacle arranged back of the adjacent edges of said panels to receive and retain means for sealing the opening between said edges, said receptacle and said channel members having interengaging parts mounting the former on the latter.

4. In a wall structure of the character described and having a body part, a pair of channel members secured therewith to extend therealong as runners opening outwardly thereof in parallel spaced relation with each other, a pair of surfacing panels having opposite end parts inwardly turned and entering said channel members and there secured, whereby said panels are mounted on said wall body part between said channel members, said panel members having their intermediate parts between their said ends spaced from said wall body part and said panel members being disposed adjacent each other, and a receptacle arranged back of the adjacent edges of said panels to receive and retain means for sealing the opening between said edges, said receptacle and said channel members having interengaging parts mounting the former on the latter, said interengaging parts being arranged to permit adjustment of said receptacle lengthwise of said channel members to register with said opening.

5. In a wall structure of the character described and having a body part, a channel member secured therewith to extend therealong as a runner opening outwardly thereof, said member having lateral inwardly turned lips forming lateral grooves back of the lips, a surfacing panel member having an inwardly turned reentrant part entering one of the grooves of said channel member to secure the corresponding edge of said panel to said wall body part, and a second surfacing panel having an inwardly turned reentrant part sprung into said channel member and bearing between said first panel and the opposite channel groove to maintain both panels in assembly with said channel, said panels extending oppositely from said channel.

6. In a wall structure of the character described and having a body part, a channel member of uniform transverse section secured therewith to extend therealong as a runner opening outwardly thereof, said runner having laterally spaced inwardly turned lips forming longitudinally extending grooves back of the lips, a pair of surfacing panel members having adjacent edge parts each inwardly turned to enter the hollow of said runner and seat in the near groove, and sealing means in said hollow between the edge parts of said panel members, to maintain said seating in their grooves and thereby maintain the mounting of said panel members on said runner, and to provide a seal at the joint between said panel members.

7. In a wall structure of the character described and having a body part, a plurality of channel members secured therewith to extend therealong in parallel spaced relation as runners, a plurality of sealing members each mounted upon a pair of runner members to extend therebetween as a stretcher, said stretchers and runners being thereby arranged to define a quadrilateral panel pattern, and, for a panel of said pattern, a surfacing panel member mounted at opposite edges upon the adjacent pair of runners, a pair of said stretchers being positioned between and along said runners to underlie the other end edges of said panel member.

8. In a wall structure of the character described and having a body part, a plurality of channel members secured therewith to extend therealong in parallel spaced relation as runners, a plurality of sealing members each mounted upon a pair of runner members to extend therebetween as a stretcher in an adjusted position therealong, said stretchers and runners being thereby arranged to define a quadrilateral panel pattern, and, for a panel of said pattern, a surfacing panel member having means removably securing its corresponding edges with the adjacent pair of runners, and said surfacing panel member having its other end edges disposed to overlie the adjacent pair of stretchers, said pair of stretchers being suitably adjusted along said pair of runners for the purpose.

9. In a wall structure of the character described and having a body part, a plurality of channel members secured therewith to extend therealong in parallel spaced relation as runners, a plurality of sealing members each mounted upon a pair of runner members to extend therebetween as a stretcher, and slidably adjustable therealong, said stretchers and runners being thereby arranged to define a quadrilateral panel pattern, and, for a panel of said pattern, a surfacing panel member mounted at opposite edges upon the adjacent pair of runners, a pair of said stretchers being adjusted on said pair of runners to underlie the other end edges of said panel member.

10. In a wall structure of the character described and having a body part, a plurality of channel members secured therewith to extend therealong in parallel spaced relation as runners, a plurality of sealing members each removably mounted upon a pair of runner members to extend therebetween as a stretcher, said runners and stretchers having interengaging parts for the purpose and said interengaging parts permitting sliding adjustment of said stretchers along said runners, said stretchers and runners being thereby arranged to define a quadrilateral panel pattern, and, for a panel of said pattern, a surfacing panel member mounted at opposite edges upon the adjacent pair of runners, said surfacing panel member having its other end edges disposed to overlie the adjacent pair of stretchers.

11. In a wall structure of the character described and having a body part, a plurality of channel members secured therewith to extend horizontally therealong in parallel spaced relation as runners, each runner having a longitudinally extending dependent hooked part, a plurality of sealing members each having a hook part cooperative with the hook part of an upper runner, whereby the sealing member is removably mounted upon the runner to be dependent therefrom, each sealing member extending from its supporting runner to a runner therebelow, with its lower extremity overlying a portion of the lower runner, whereby each sealing member extends as a stretcher between a pair of runner members, and said stretchers and runners define a quadrilateral panel pattern, and, for a panel of said pattern, a surfacing panel member mounted at opposite top and bottom edges upon a pair of runners, said surfacing panel member having its other end edges disposed to overlie the corresponding pair of stretchers.

12. In a wall structure of the character described and having a body part, a plurality of channel members secured therewith to extend therealong in parallel spaced relation as runners, a plurality of sealing members each mounted upon a pair of runner members to extend therebetween as a stretcher, said stretchers and runners being thereby arranged to define a quadrilateral panel pattern, surfacing panel members for the panels of said pattern, each surfacing panel member being mounted at opposite end edges upon the adjacent pair of runners, and having a pair of stretchers disposed to underlie its other end edges, the panel member edges overlying a stretcher being spaced to receive sealing means therebetween, and the underlying stretcher being adapted to retain said sealing means.

13. In a wall structure of the character described and having a body part to which surfacing panels are to be applied, a pair of runner means secured with said body part to extend therealong in parallel spaced relation, and adapted to be engaged by opposite edges of a panel member therebetween, one of said interengaging parts having resilience for permitting and maintaining said engagement.

14. In a wall structure of the character described and having a body part to which surfacing panels are to be applied, a pair of runner means secured with said body part to extend therealong in parallel spaced relation, and being recessed to be engaged by and to secure opposite edges of a panel member therebetween, one of said interengaging parts having resilient flexibility for permitting and maintaining said engagement.

15. In a wall structure of the character described and having a body part to which surfacing panels are to be applied, a pair of runner means secured with said body part to extend therealong in parallel spaced relation, and a panel member mounted to extend therebetween, and for the purpose said runner means being recessed to engage and secure the opposite edges of said panel member, and said panel member having resilient flexibility for permitting and maintaining said engagement of its said edges.

MUNROE W. COPPER, JR.
RUSSELL L. HOHL.